United States Patent
Pratt

[19]

[11] Patent Number: 6,146,051
[45] Date of Patent: Nov. 14, 2000

[54] PAVING SYSTEM FOR SPILLAGE AND FLOOD MANAGEMENT

[75] Inventor: Christopher John Pratt, Leics, United Kingdom

[73] Assignee: Conventry University, Coventry, United Kingdom

[21] Appl. No.: 09/365,649

[22] Filed: Aug. 2, 1999

Related U.S. Application Data

[63] Continuation of application No. 08/817,819, Apr. 14, 1998, abandoned.

[30] Foreign Application Priority Data

Oct. 14, 1994 [GB] United Kingdom .................... 9420812

[51] Int. Cl.$^7$ ....................................................... C02F 3/04
[52] U.S. Cl. ................................. 404/2; 404/30; 404/31; 405/38; 405/50; 405/55
[58] Field of Search .............................. 404/2, 4, 17, 27, 404/28, 30, 31, 36, 39, 71, 34, 38, 19; 405/38, 50, 52, 53, 55, 43, 44, 45; 472/92

[56] References Cited

U.S. PATENT DOCUMENTS

| | | |
|---|---|---|
| D. 100,215 | 6/1936 | Klipfel . |
| 3,640,787 | 2/1972 | Heller . |
| 3,682,476 | 8/1972 | Kempson et al. ........................ 472/92 |
| 3,870,422 | 3/1975 | Medico, Jr. . |
| 3,909,143 | 9/1975 | Cushman .................................. 404/27 |
| 4,052,131 | 10/1977 | Lowrigkeit . |
| 5,026,207 | 6/1991 | Heath ....................................... 405/46 |
| 5,310,280 | 5/1994 | Hara . |

FOREIGN PATENT DOCUMENTS

| | | |
|---|---|---|
| 0704573 | 4/1996 | European Pat. Off. . |
| 2642774 | 8/1990 | France . |
| 93 16 175 U | 10/1994 | Germany . |
| 4410482 | 3/1995 | Germany . |
| 85/00631 | 2/1985 | WIPO . |

OTHER PUBLICATIONS

WO91/16496 (English Abstract only), Oct. 1991, Yotaro.

*Primary Examiner*—James A. Lisehora
*Attorney, Agent, or Firm*—Oppenheimer Wolff & Donnelly LLP

[57] ABSTRACT

The paving system has a perforated pavement covering a deep substrate of mainly hard nodules or shells, the whole being surrounded by impervious walls to provide temporary storage in the interstices for chemical spillage or flood water, wherein liquids may be chemically treated or biologically decomposed, and from whence the rate of outflow may be regulated, the pavement consisting of preformed pavings of brick, concrete or other material, laid edge to edge without mortar or cement, and these pavings can be perforated or notched to allow liquids to run down into the substrate. The pavings are laid on a screen which filters out solid particles to reduce clogging. The system allows biological substances to grow, or be introduced, with or without additional nutrients, and allows chemical treatments to be introduced, from above, when needed. The whole pavement system can be lifted out for cleaning or, substitution, and relaid as new.

35 Claims, 2 Drawing Sheets

PAVING SYSTEM FOR SPILLAGE AND FLOOD MANAGEMENT

This invention is a continuation of U.S. patent application Ser. No. 08/817,819 filed Apr. 14, 1998, now abandoned, which is based of Patent Cooperation Treaty International Application No. PCT/GB95/02434 filed Oct. 16, 1995.

BACKGROUND OF THE INVENTION

1. Field of the Invention

2. Description of the Related Art

Paved surfaces are required in many situations where the impermeability of a conventional pavement is essential, but not without disadvantages. In some situations—refuelling stations, chemical loading bays and vehicle parks, for instance—there may be risk of spillage of fluids which must be prevented from entering the drainage system and so passing by uncontrolled discharge into the environment, and must be prevented from entering the environment at all without preliminary treatment.

Where there are large areas of pavement—motorways, for instance—flash storms may cause such flooding that existing storm-water provisions become overloaded. There have been occasions, too, when emergency treatment of spillage after accidents involving chemical tankers has resulted in serious damage to the environment over side areas.

Where risks of chemical contamination are low, various forms of porous pavement have been employed, allowing spillage to soak away into the ground beneath. There is, however, a limited rate at which ground can absorb moisture, and there remains a risk of flooding when rainfall is very high.

WO-A-8 500 631 describes a structure for controlling an artificial water table beneath a tennis court or agricultural land in which a ballast layer of generally uniform size rock is laid on top of a watertight membrane in a basing, the ballast layer being extremely permeable by water. The ballast layer is covered by a permeable membrane which is covered by a layer of finely divided particles which are prevented from penetrating the ballast layer by the permeable membrane. Water diffuses through the fine layer by capillary action. Water is inserted in the ballast layer, causing the water table in it to rise to and above the permeable membrane. The amount of water provided to a finished layer above the fine layer can be adjusted by raising and lowering the water level.

DE-A-3 041 624 describes a method of sealing and draining an area of ground where the regions to be sealed are limited by kerb stones, some of which have discharge channels.

BRIEF SUMMARY OF THE INVENTION

According to the present invention, there is provided a paving system for spillage or floodwater management comprising:

a permeable layer (1) providing an upper surface;

a supporting substrate layer thereunder which is permeable to liquid;

and a containment membrane of impermeable material containing said substrate layer for controlled retention of liquid therein;

wherein:

said permeable layer enables the drainage of spillage or floodwater therethrough into the substrate layer and the introduction of treatment material into said substrate layer;

the substrate layer is of particular material and is of a material which is non-friable and non-susceptible to frost;

the particles of the substrate layer are of irregular shape thereby to provide interstitial cavities therebetween in which draining spillage or floodwater or introduced treatment material can dwell, and are of a size in the range of 15 mm to 300 mm;

and the system is arranged to enable biological decomposition of pollutants to occur in said substrate layer.

In a preferred form of the invention a filtering layer is provided intermediate the paving and substrate layers for filtering solids from liquid permeating through the paving layer, and a dispersing layer is located intermediate the paving and filtering layers for dispersing liquid permeating from the paving layer over the filtering layer.

The paving layer is conveniently perforated to allow the liquid to run through into a tank or channel formed by the containment membrane layer.

The paving layer, which forms the pavement may be a single sheet laid or cast over the whole of, or a large section of, an area, in which the perforations may conveniently be simple holes. However, it is advantageous to have holes of small span to stop ingress of foreign objects, but of long periphery to facilitate dispersion of the fluid underneath the pavement. Slot-like holes are therefore attractive, and these can conveniently be provided by grooves on the outside of prefabricated pavings.

In a further preferred arrangement, the pavement may be formed by pavings of such size and mass as to be convenient to handle continually without fatigue, and designed to be laid close-fitting without mortar or cement. They may be made in any material suitable for any particular application, such as brick, concrete, or cast iron, and must be of sufficient depth to ensure dispersion of the concentrated loads applied. Concurrently, they are of sufficient depth to prevent them tipping over under load, given the lateral freedom allowed by close-fitting laying. Pavings may have holes through them, but from many points of view it is preferable that the perforations be grooves in the interfaces separating adjacent pavings. Paviours find this type of pavement cheap and easy to lay, with the further advantage that pavings can easily be lifted when required.

The incorporation of raised pads on the upper surfaces of at least some of the pavings prevents compression of the gravel filling around the paving and reduces the danger of hydroplaning in storm conditions, and is a preferred feature.

Underneath the pavings, the filtering layer is a geotextile layer used to filter out unwanted solids. This is preferably between 1 mm and 1.5 mm thick.

The pavings are laid on a bed of gravel or crushed gravel or other small grained particulate material (the dispersing layer) which covers the geotextile layer, and the same or similar material is dropped into the perforations and around the raised pads. The layer is a material which is not readily friable, dissolved or susceptible to frost and is substantially inert to water. The particle size is preferably of a minimum 5 mm diameter to a maximum of 10 mm diameter. The particle size may vary within the above range in the layer.

This particulate layer provides a flat surface for the pavings and ensures that the geotextile layer is uniformly loaded. Moreover, it helps to disperse the fluid from the perforations uniformly over the surface of the geotextile layer, and provides an initial screening of the fluid to minimize clogging of the geotextile layer beneath. The particulate infill provides a relatively smooth surface for humans and animals to walk on, and is easily weeded when necessary.

Beneath the geotextile layer is the substrate proper (the substrate layer) which lies on, and is contained by, the impermeable membrane described above. This is a deep layer of mainly hard nodules. These could be hollow, and there may be advantage in some being hollowed out or drilled as described below, but they are most efficient when solid. They are of irregular or lobate form so that they remain firmly in place under load but are surrounded by interstitial cavities in which the drained fluid can dwell.

These nodules may be of any suitable material: crushed stone, pebbles and blast furnace slag are typical examples, but special materials or shapes may be needed in particular applications. The size and type of nodule affects the storage and release capabilities of the paving system. The material used for the substrate is also a material which is not readily friable, dissolved or susceptible to frost. It is also substantially inert to water. The material consists of particles of differing sizes in the range of 15 mm to 300 mm (preferably 15 mm–200 mm) and the particle size may vary within the substrate layer. However, the majority of particles in the material preferably are of a size nearer the lower end of this range.

This system ideally meets the requirements for biological decomposition of certain types of harmful spillage. Bacteria breed on the substrate walls if spillages are not infrequent, and fresh cultures of different bacteria can be introduced into the substrate cavities when needed. It may be advantageous to provide "nests," perhaps in porous or hollow nodules, in which suitable bacteria can breed awaiting the next spillage. It may be necessary in some cases to provide nutrient occasionally to ensure that the bacteria do remain available. Cultures and nutrient can be introduced from above the pavement when necessary without disturbing the pavement.

Chemicals also may be introduced in this way for spillages that are not amenable to biological treatment.

It is an important advantage of this construction that all its elements can easily be lifted out for examination, flushing or other cleaning, or substitution if needed, and the geotextile member can be replaced when it is clogged.

Weirs or dividers can be introduced into the substrate to isolate sections of the tank or channel, either for floodwater control in sloping channels or to allow chemical or biochemical treatment of spillage. Such weirs might be built within the impermeable membrane, but there may be advantage in some cases in embedding a smoothly grooved U-shaped component into the ground before the impermeable membrane is laid, and then sliding a pre-fabricated mating weir into position within the membrane is laid, and then sliding a pre-fabricated mating weir into position within the membrane lying over the U-shaped component, or sealingly attached to it, to trap the membrane without damaging it. Depending on the application, weirs may be porous, as for floodwater control, or impervious, as for chemical or biochemical treatment of spillages.

Where the cavity within the impermeable membrane is compartmentalized by end closures or impermeable weirs there will be need for valves and discharge ducts for drainage. The provision of the valves and ducts that are sealingly connected to an impermeable membrane is well understood by those skilled in the art and need not be considered here.

This ability to process spillages in situ is regarded as a highly desirable feature of the newly invented system described here. Appropriate chemicals can be admitted into specific containment sections so that hazardous fluids are rendered harmless before they are diluted in more general effluent systems. Added chemicals may themselves be hazardous or harmful in some instances, so by treating the spillage in exact proportions in isolation the overall damage can be minimized. It is much more difficult to do this when the spillage has already been intermixed with fluids from other sources.

DETAILED DESCRIPTION OF THE INVENTION

The present invention is further described hereinafter, by way of example, with reference to the accompanying drawings, in which.

Figure 1:
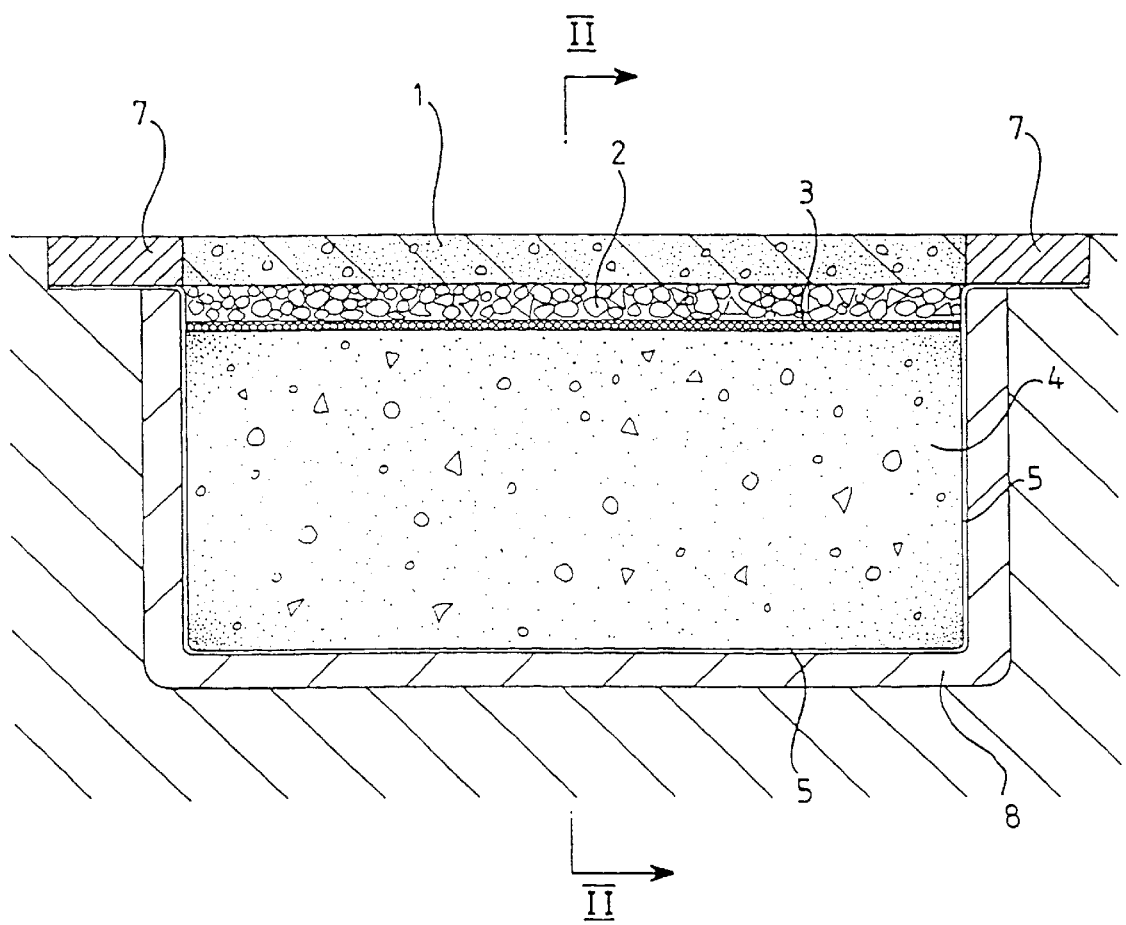
FIG. 1 shows a transverse cross-section on the line I—I of FIG. 2 through a preferred embodiment of a paving system according to the present invention.
Figure 2:
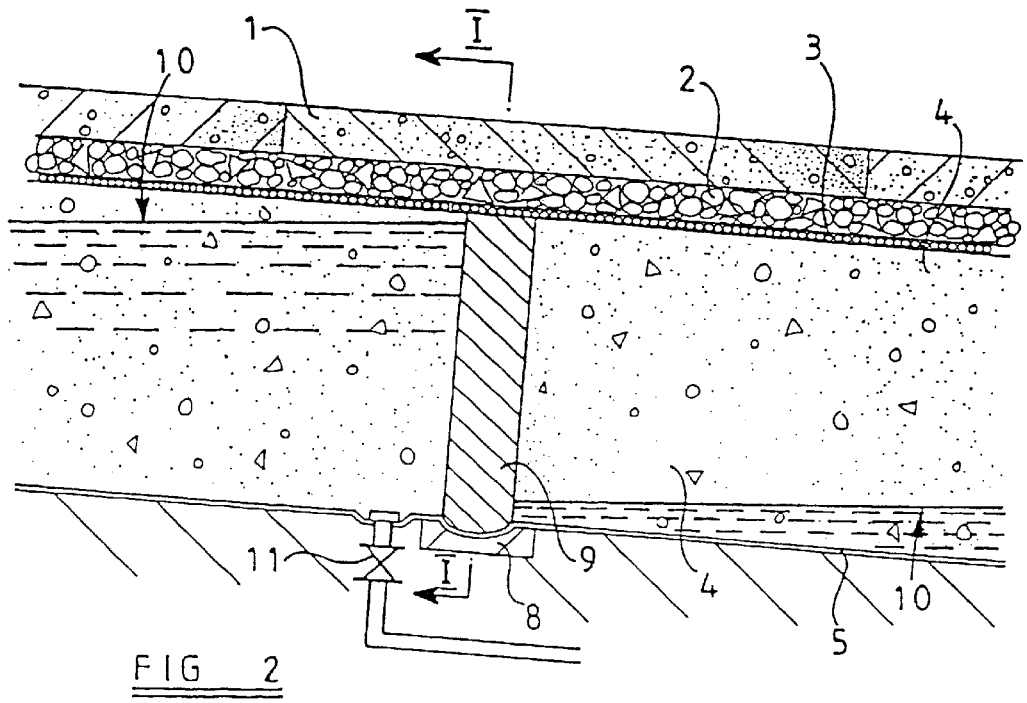
FIG. 2 shows a longitudinal cross-section on the line II—II of the paving system of FIG. 1.
Figure 3:
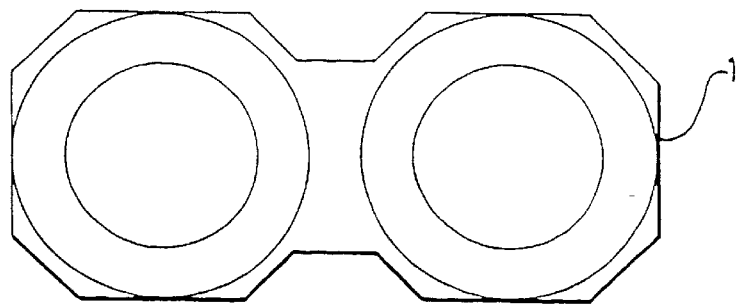
FIG. 3 illustrates a typical discrete paving suitable for use in this paving system.

Referring to the drawings, discrete pavings 1 are laid on a bed of gravel as shown at 2, and underneath this bed of gravel is a geotextile layer shown at 3.

A substrate of crushed stone is shown at 4.

The impermeable plastics membrane is shown underneath the substrate at 5 and up the sides of the duct. The top of the impermeable membrane is trapped in this case under border stones as shown at 7.

A suggested U-frame used to retain a divider in the form of a weir 9, is shown at 8.

The weir fits inside the U-frame 8. Here, the impermeable membrane 5 is shown trapped between the weir 9 and the U-frame 8. The weir relies upon the support given by the substrate 4. The weir 9 may extend at least a portion of the height of the substrate 4.

A difference in fluid levels on the two sides of the weir 9 is indicated by the two arrows at 10, and a drain valve and outlet pipe is indicated at 11. Since the weir is always at the lowest point of any containment, the valve mounting could be included in the U-frame 8, but it is shown discrete here for clarity.

What is claimed is:

1. A paving system configured for spillage and flood water management adapted to support repeated vehicular loading comprising:

a paving layer pervious to passage of fluids;

a supporting substrate layer of particulate material thereunder which is pervious to passage of fluids; and, a tank or channel located under the paving layer, configured to receive and retain fluids which pass through said paving layer, said tank or channel being defined by an uninterrupted containment membrane of impermeable material configured to contain the supporting substrate layer and prevent horizontal and downward migration of fluids outward from the supporting substrate layer and thereby prevent escape of fluids from said substrate layer, for retention of liquid therein;

wherein:

said paving layer has passages enabling the drainage of spillage or floodwater therethrough into the substrate layer and the introduction of treatment material into said substrate layer;

the substrate layer is comprised of particular material having a plurality of particles and is of a material which is non-friable and non-susceptible to frost;

the particles of the substrate layer are of a shape configured to provide interstitial cavities therebetween in which draining spillage or floodwater or introduced treatment material can dwell, and are of a size in the range 15 mm to 300 mm;

and the system is arranged to enable biological decomposition of pollutants to occur in said substrate layer.

2. A paving system as claimed in claim 1 wherein a filtering layer is provided intermediate the paving and substrate layers for filtering solids from spillage or floodwater draining through the paving layer.

3. A paving system as claimed in claim 2 wherein a dispersing permeable layer is provided between the paving and filtering layers for dispersing spillage or floodwaters draining through the paving layer over the filtering layer.

4. A paving system as claimed in claim 3 wherein the dispersing permeable layer is of particulate material.

5. A paving system as claimed in claim 4 wherein the average particle size of said dispersing permeable layer is smaller than that of the substrate layer.

6. A paving system as claimed in claim 4 wherein the particles of the dispersing permeable layer have a diameter in the range of 5 mm to 10 mm.

7. A paving system as claimed in claim 3 wherein the dispersing permeable layer is of a material which is non-friable and non-susceptible to frost.

8. A paving system as claimed in claim 2 wherein the filtering layer is of geotextile material.

9. A paving system as claimed in claim 2 wherein the thickness of the filtering layer is in the range of 1 mm to 1.5 m.

10. A paving system as claimed in claim 1 wherein the substrate layer is partially or fully divided by one or more impermeable divider means into sections within the containment membrane containing the substrate layer for spillage or floodwater control or to allow for effective treatment of spillage in said substrate layer.

11. A paving system as claimed in claim 10 wherein the divider means extends from the base of the containment membrane for at least a portion of the height of said substrate layer for preventing or restricting passage of drained spillage or floodwater or introduced treatment material from one section of the substrate layer to an adjacent section or sections.

12. A paving system as claimed in claim 11 wherein the divider means extends for the height of said substrate layer.

13. A paving system as claimed in claim 10 wherein the divider means is supported by a respective support member, said containment membrane being retained between each of said divider means and the support member.

14. A paving system as claimed in claim 13 wherein the support member is substantially U-shaped having an inner groove extending the length thereof so as slidably to receive said divider means.

15. A paving system as claimed in claim 10 wherein the containment membrane is formed as an elongate channel having a base portion and side portions wherein each side portion extends up at least substantially as high as the supporting substrate layer and the divider means extends for the full width of the channel.

16. A paving system as claimed in claim 1 wherein the containment membrane is of impermeable plastics material.

17. A paving system as claimed in claim 1 wherein said paving layer is perforated for the drainage of spillage or floodwater therethrough into the substrate layer and for the introduction of treatment material into the substrate layer.

18. A paving system as claimed in claim 1 wherein said paving layer has openings for the drainage of spillage or floodwater therethrough into the substrate layer and for the introduction of treatment material into the substrate layer.

19. A paving system as claimed in claim 18 wherein the openings through the paving layer are of slot-like form.

20. A paving system as claimed in claim 1 wherein the paving layer is formed by a plurality of discrete pavings having lateral abutting edge surfaces.

21. A paving system as claimed in claim 20 wherein each discrete paving is provided with at least one groove in at least one of said abutting edge surfaces, each said groove extending for the thickness of said paving thereby to form slot-like holes.

22. A paving system as claimed in claim 20 wherein at least some of the discrete pavings are provided with raised pads on an upper surface thereof.

23. A paving system as claimed in claim 1 wherein said paving layer is formed by a single sheet laid or cast over the whole of or at least a large section of an area.

24. A paving system as claimed in claim 1 wherein the particle size of the substrate layer is in the range of 15 mm to 300 mm with the particles being predominantly of a size nearer to the lower end of the range.

25. A paving system as claimed in claim 24 wherein the particle size of the substrate layer is in the range of 15 mm to 200 mm with the particles being predominantly of a size nearer to the lower end of the range.

26. A paving system as claimed in claim 1 wherein said particles are of lobate form.

27. A paving system as claimed in claim 1 wherein said particles are porous or hollow.

28. A paving system as claimed in claim 1 wherein said paving system further comprises a drain valve and outlet pipe provided for enabling spillage or floodwater such as treated spillage to be drained from said containment membrane and substrate layer, said drain valve and outlet pipe being sealingly connected to the impermeable membrane and configured to maintain the liquid volume holding capacity of said tank or channel.

29. A paving system as claimed in claim 1 having interstitial cavities enabling gas to be drawn through at least said substrate layer.

30. A paving system as claimed in claim 29 wherein said gas is atmospheric air.

31. A paving system as claimed in claim 29 wherein said gas is substantially oxygen or carbon dioxide.

32. A paving system for spillage or flood water management adapted to support repeated vehicular loading comprising:

a paving layer pervious to passage of fluids;

a supporting substrate layer thereunder which is pervious to passage of fluids;

and a containment membrane of impermeable material enclosing said substrate layer for controlled retention of liquid therein:

said paving layer having passages for the drainage of spillage or floodwater therethrough and the introduction of treatment material into said substrate layer;

the substrate layer comprised of particulate material having a plurality of particles and is of a material which is non-friable and non-susceptible to frost;

the particles of the substrate layer having an irregular shape thereby to provide interstitial cavities therebetween in which draining spillage or floodwater or introduced treatment material can dwell to enable biological decomposition of pollutants to occur in said substrate layer, the substrate layer being partially or fully divided by one or more impermeable dividers into sections within the containment membrane containing the substrate layer for spillage or floodwater control or to allow for effective treatment of spillage in said substrate layer, each of said one or more dividers being supported by a respective support member, said containment membrane being retained between the one or more dividers and the support member.

33. A paving system as claimed in claim 32 wherein the support member is substantially U-shaped having an inner groove extending the length thereof so as to slidably receive said one or more dividers.

34. A paving system as claimed in claim 32 wherein the containment membrane is formed as an elongate channel having a base portion and side portions wherein each side portion extends up to the permeable layer and the one or more dividers extend for the full width of the channel.

35. A paving system as claimed in claim 32 further comprising a valve and discharge duct configured enable spillage or floodwater such as treated spillage to be drained from said containment membrane and substrate layer when desired by controlled fluid flow through the discharge duct.

* * * * *